US011830014B2

(12) United States Patent
Van Canh

(10) Patent No.: US 11,830,014 B2
(45) Date of Patent: Nov. 28, 2023

(54) METHOD FOR RECEIVING MERCHANT INFORMATION AND ELECTRONIC DEVICE USING SAME

(71) Applicant: SAMSUNG ELECTRONICS CO., LTD., Suwon-si (KR)

(72) Inventor: Nguyen Van Canh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 203 days.

(21) Appl. No.: 16/957,541

(22) PCT Filed: Jan. 24, 2019

(86) PCT No.: PCT/KR2019/000996
§ 371 (c)(1),
(2) Date: Jun. 24, 2020

(87) PCT Pub. No.: WO2019/147029
PCT Pub. Date: Aug. 1, 2019

(65) Prior Publication Data
US 2021/0065210 A1 Mar. 4, 2021

(30) Foreign Application Priority Data

Jan. 26, 2018 (KR) .................. 10-2018-0010074

(51) Int. Cl.
*G06Q 30/018* (2023.01)
*G06F 3/04842* (2022.01)
(Continued)

(52) U.S. Cl.
CPC ..... *G06Q 30/0185* (2013.01); *G06F 3/04842* (2013.01); *G06Q 30/0641* (2013.01);
(Continued)

(58) Field of Classification Search
CPC ............. G06Q 30/018; G06Q 30/0185; G06Q 30/0641; G06Q 20/322; G06Q 20/327;
(Continued)

(56) References Cited

U.S. PATENT DOCUMENTS 9,009,805 B1 * 4/2015 Kirkby ................ G11B 27/005
709/224
10,872,330 B2 * 12/2020 Dragushan ......... G06Q 30/0207
(Continued)

FOREIGN PATENT DOCUMENTS

KR 10-2005-0094797 9/2005
KR 10-2012-0049306 5/2012
(Continued)

OTHER PUBLICATIONS

A. M. Ramtohul, K. K. Khedo, Y. Bhoobun and V. Sohotoo, "MobiShop: A secure Proximity based Social Networking application for the mall of Mauritius," 2017 1st International Conference on Next Generation Computing Applications (NextComp), 2017, pp. 202-208, doi: 10.1109/NEXTCOMP.2017.8016199 (Year: 2017).*
(Continued)

*Primary Examiner* — Andrew L Tank
(74) *Attorney, Agent, or Firm* — Nixon & Vanderhye, P.C.

(57) ABSTRACT

An example electronic device includes a display, a communication module, a memory, and a processor. The processor is configured to scan, through the communication module, at least one signal emitted by at least one external electronic device around the electronic device; to receive, through the communication module, identification information corresponding to a first external electronic device from the first external electronic device representative of a merchant; to verify the received identification information; to request, through the communication module, a second external elec-
(Continued)

tronic device for merchant information corresponding to the merchant when the verification of the identification information is completed; and to receive, through the communication module, the merchant information from the second external electronic device.

14 Claims, 13 Drawing Sheets

(51) Int. Cl.
| | |
|---|---|
| G06Q 30/0601 | (2023.01) |
| H04L 9/32 | (2006.01) |
| H04W 12/08 | (2021.01) |
| H04W 64/00 | (2009.01) |
| G06Q 20/32 | (2012.01) |

(52) U.S. Cl.
CPC ........... *H04L 9/3242* (2013.01); *H04W 12/08* (2013.01); *H04W 64/00* (2013.01); *G06Q 20/322* (2013.01)

(58) Field of Classification Search
CPC . G06F 3/04842; H04L 9/3242; H04L 63/061; H04L 63/0876; H04L 19/0822; H04L 9/0822; H04W 12/08; H04W 64/00; H04W 12/041; H04W 76/11
See application file for complete search history.

(56) References Cited

U.S. PATENT DOCUMENTS

| | | | | |
|---|---|---|---|---|
| 10,952,263 | B2* | 3/2021 | Ringland | ............... H04L 63/083 |
| 11,093,960 | B2* | 8/2021 | Milton | ................... G06Q 30/02 |
| 2011/0028160 | A1* | 2/2011 | Roeding | ............ G06Q 30/0217 |
| | | | | 455/456.1 |
| 2011/0307578 | A1* | 12/2011 | Cheon | ................... G06F 3/0482 |
| | | | | 709/217 |
| 2013/0013757 | A1* | 1/2013 | Millington | .......... H04L 12/2807 |
| | | | | 709/222 |
| 2013/0225215 | A1 | 8/2013 | Kolde | |
| 2013/0235859 | A1 | 9/2013 | Sun et al. | |
| 2013/0301607 | A1* | 11/2013 | McCann | ............. H04W 12/041 |
| | | | | 370/328 |
| 2014/0164029 | A1* | 6/2014 | Kwak | .................... G06Q 10/02 |
| | | | | 705/5 |
| 2014/0323049 | A1 | 10/2014 | Park et al. | |
| 2014/0337950 | A1 | 11/2014 | Yang et al. | |
| 2016/0078484 | A1* | 3/2016 | Emigh | .................... G01S 5/015 |
| | | | | 705/14.58 |
| 2016/0335627 | A1* | 11/2016 | Hugot | ................ G06Q 20/3825 |
| 2017/0201378 | A1* | 7/2017 | Kim | ..................... H04L 63/0876 |
| 2017/0251400 | A1 | 8/2017 | Jha et al. | |

FOREIGN PATENT DOCUMENTS

| | | | | |
|---|---|---|---|---|
| KR | 20140033824 A | * | 3/2014 | ........... H04L 9/0643 |
| KR | 10-2014-0102790 | | 8/2014 | |
| KR | 10-2015-0068540 | | 6/2015 | |
| KR | 10-2015-0126150 | | 11/2015 | |
| KR | 10-2016-0011304 | | 2/2016 | |
| KR | 10-1692019 | | 1/2017 | |
| KR | 10-1790784 | | 10/2017 | |

OTHER PUBLICATIONS

D. Namiot and M. Sneps-Sneppe, "Proximity as a service," 2012 2nd Baltic Congress on Future Internet Communications, 2012, pp. 199-205, doi: 10.1109/BCFIC.2012.6217947 (Year: 2012).*
S. Al Mazahreh and C. M. Frenz, "Wireless access point specific location based encryption," 2013 IEEE Long Island Systems, Applications and Technology Conference (LISAT), 2013, pp. 1-3, doi: 10.1109/LISAT.2013.6578233 (Year: 2013).*
T. Radivilova and H. A. Hassan, "Test for penetration in Wi-Fi network: Attacks on WPA2-PSK and WPA2-enterprise," 2017 International Conference on Information and Telecommunication Technologies and Radio Electronics (UkrMiCo), Odessa, Ukraine, 2017, pp. 1-4, doi: 10.1109/UkrMiCo.2017.8095429. (Year: 2017).*
X. Lin, Z. Huafei, P. .-H. Ho and X. Shen, "Two-Factor Localized Authentication Scheme for WLAN Roaming," 2007 IEEE International Conference on Communications, Glasgow, UK, 2007, pp. 1172-1178, doi: 10.1109/ICC.2007.199. (Year: 2007).*
Communication pursuant to Article 94(3) EPC dated Feb. 11, 2022 in counterpart European Patent Application No. 19743879.9.
International Search Report for PCT/KR2019/000996, dated Apr. 30, 2019, 4 pages.
Written Opinion of the ISA for PCT/KR2019/000996, dated Apr. 30, 2019, 4 pages.
Extended Search Report dated Oct. 9, 2020 in counterpart European Patent Application No. 19743879.9.
Office Action dated Apr. 5, 2023 in Korean Application No. 10-2018-0010074 and English-language translation.

* cited by examiner

METHOD FOR RECEIVING MERCHANT INFORMATION AND ELECTRONIC DEVICE USING SAME

This application is the U.S. national phase of International Application No. PCT/KR2019/000996 filed 24 Jan. 2019, which designated the U.S. and claims priority to KR Patent Application No. 10-2018-0010074 filed 26 Jan. 2018, the entire contents of each of which are hereby incorporated by reference.

BACKGROUND

Field

Various embodiments of the disclosure relate to a method for receiving merchant information and an electronic device using the same.

Description of Related Art

A mobile payment service using an electronic device is on the rise. Existing physical payment means (e.g., a credit card, a check card, etc.) may be replaced with a mobile payment means through an electronic device. The electronic device may store a payment indication corresponding to a physical payment means through a payment application, and perform a mobile payment service by using the payment indication selected by a user's request.

SUMMARY

In order for a user of an electronic device to obtain merchant information through the electronic device and order a desired product, it is necessary to individually install an application required by each merchant. In this case, as the types of merchants to be used by a user are different, the inconvenience of having to install different types of applications on the electronic device may occur. In addition, even when an individual application has been installed, the following problem may occur when the corresponding application provides product-related information by using GPS information of the electronic device. For example, when the GPS information is used, it may be difficult to accurately provide street information relating to merchants located on different floors of the same building. In addition, since the GPS information is used, a problem related to infringement of personal information may occur in that location information of the user using the electronic device is used.

An electronic device according to various embodiments may obtain product-related information provided by a plurality of merchants, the information being stored in a service server, through one payment application. A mobile payment manager may store product information, advertisement information, event information, menu information, or coupon information of merchants in the service server, and transmit, to the electronic device, at least one piece of the product information, the advertisement information, the event information, the menu information, or the coupon information of the merchants. In this case, the electronic device may receive and verify Wi-Fi SSID information corresponding to each merchant, and when the verification is completed, receive product information, etc. relating to the verified merchant from the service server. Accordingly, since a signal strength of Wi-Fi is dependent on a distance from the electronic device, the electronic device may selectively obtain information on a merchant located at a relatively close distance to the electronic device. In addition, since the electronic device performs verification through Wi-Fi SSID information, it is possible to prevent malware, spam messages, and the like from being received from an external attacker.

An electronic device according to various embodiments may include: a display; a communication module; a memory; and a processor, wherein the processor is configured to: scan, through the communication module, for at least one signal emitted by at least one external electronic device around the electronic device; receive, through the communication module, identification information corresponding to a first external electronic device representative of a merchant from the first external electronic device, based on the scanning; verify the received identification information; request, through the communication module, a second external electronic device for merchant information corresponding to the merchant when the verification of the identification information is completed; and receive, through the communication module, the merchant information from the second external electronic device.

A method of an electronic device according to various embodiments may include: scanning for at least one signal emitted by at least one external electronic device around the electronic device; receiving identification information corresponding to a first external electronic device representative of a merchant from the first external electronic device, based on the scanning; verifying the received identification information; requesting a second external electronic device for merchant information corresponding to the merchant when the verification of the identification information is completed; and receiving the merchant information from the second external electronic device.

According to various embodiments of the disclosure, an electronic device can obtain product-related information provided by a plurality of merchants, the information being stored in a service server, through one payment application. A mobile payment manager can store product information, advertisement information, event information, menu information, or coupon information of merchants in the service server, and transmit, to the electronic device, at least one piece of the product information, the advertisement information, the event information, the menu information, or the coupon information of the merchants. In this case, the electronic device can receive and verify identification information (e.g., Wi-Fi SSID) corresponding to each merchant, and when the verification is completed, receive product information, etc. relating to the verified merchant from the service server. Accordingly, since a signal strength of Wi-Fi is dependent on a distance from the electronic device, the electronic device can selectively obtain information on a merchant located at a relatively close distance to the electronic device. In addition, since the electronic device performs verification through the identification information (e.g., Wi-Fi SSID), the electronic device can prevent malware, spam messages, and the like from being received from an external attacker.

DETAILED DESCRIPTION

Figure 1:
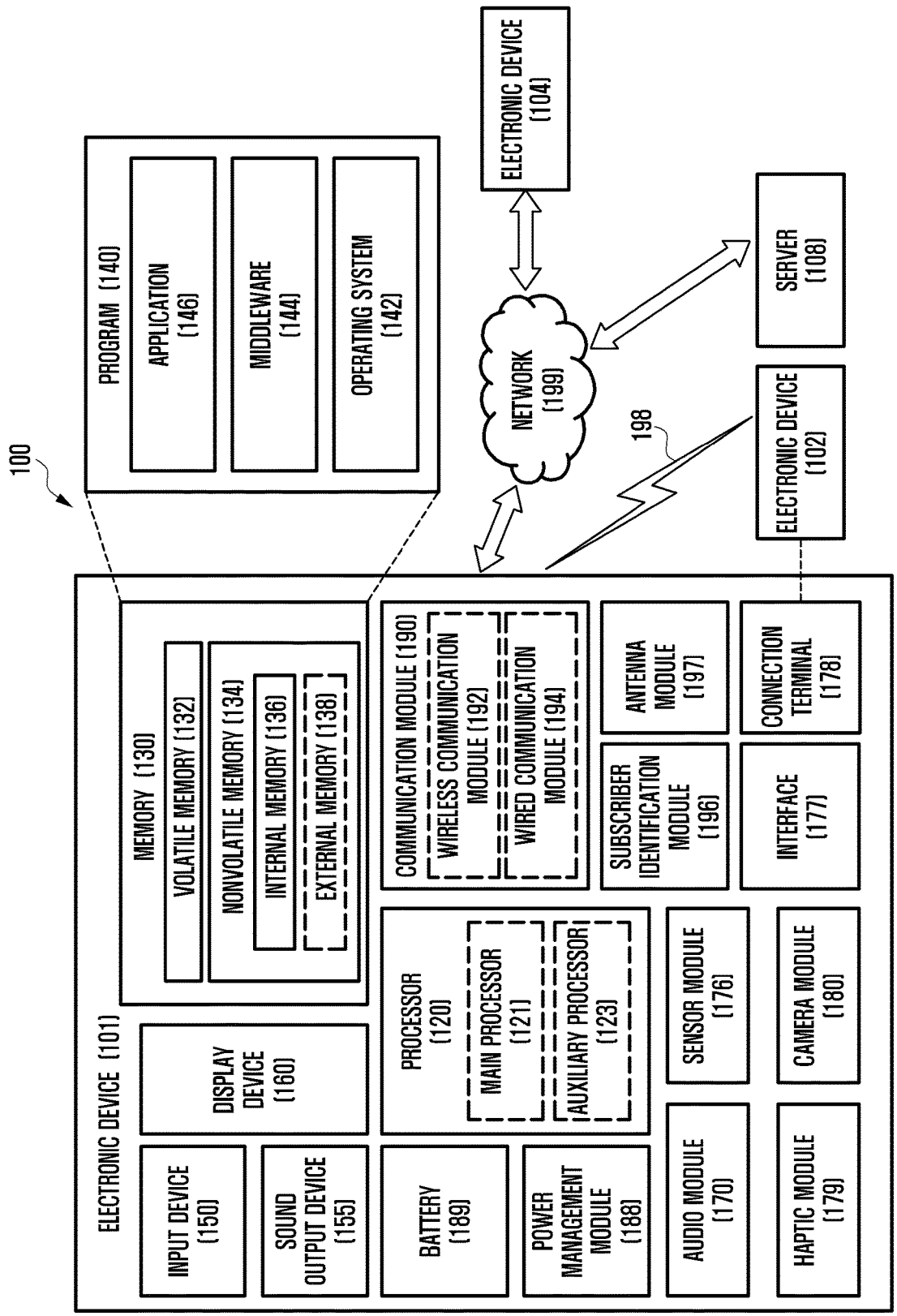
FIG. 1 is a block diagram of an electronic device in a network environment according to various embodiments of the disclosure.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. The memory 130 may store various data used by at least one component (e.g., the processor 120 or the sensor module 176) of the electronic device 101. The various data may include, for example, software (e.g., the program 140) and input data or output data for a command related thereterto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, or a keyboard.

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other.

The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include one or more antennas, and, therefrom, at least one antenna appropriate for a communication scheme used in the communication network, such as the first network 198 or the second network 199, may be selected, for example, by the communication module 190 (e.g., the wireless communication module 192). The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
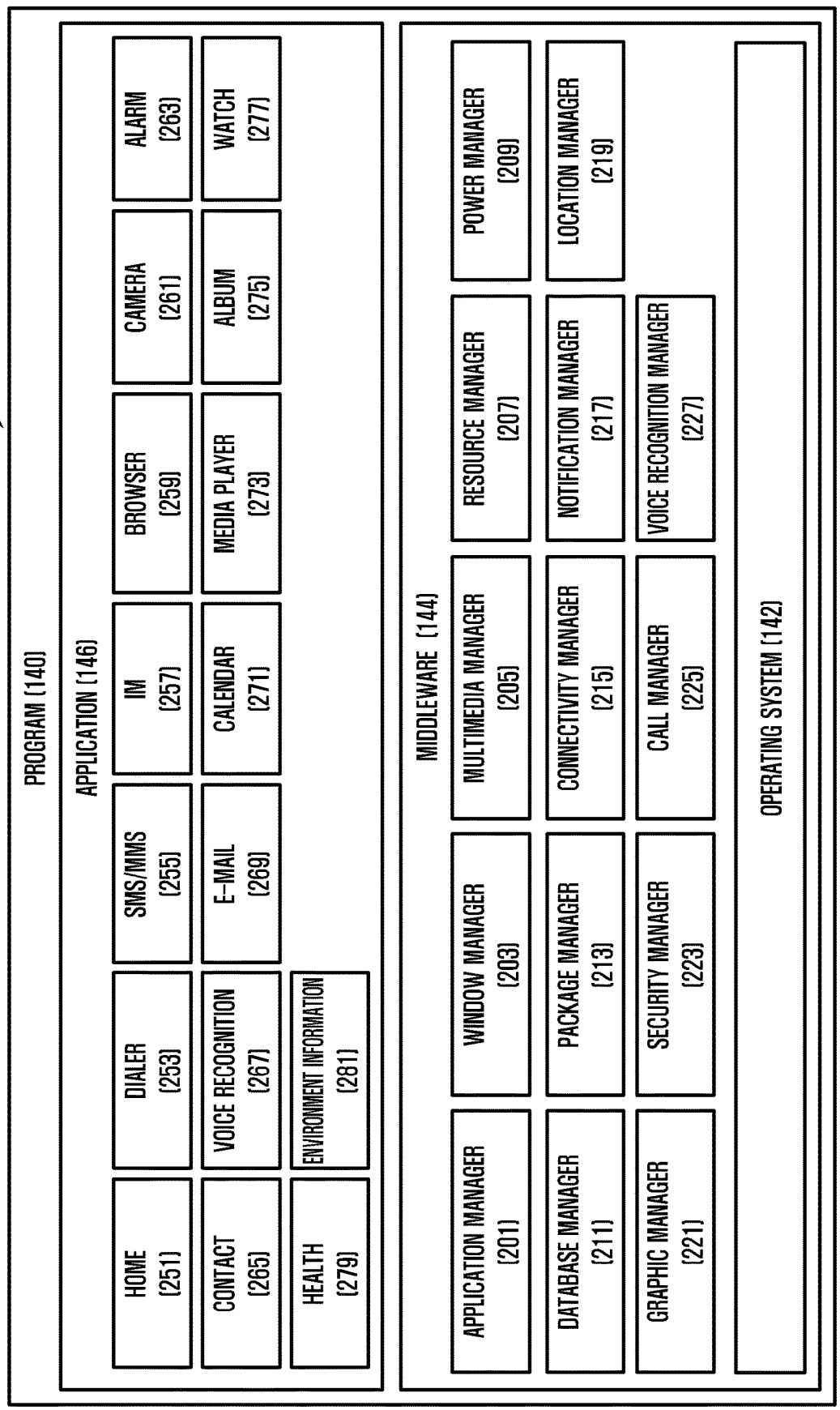
FIG. 2 is a block diagram of a program according to various embodiments of the disclosure.

FIG. 2 is a block diagram 200 illustrating the program 140 according to various embodiments. According to an embodiment, the program 140 may include an operating system (OS) 142 to control one or more resources of the electronic device 101, middleware 144, or an application 146 executable in the OS 142. The OS 142 may include, for example, Android™, iOS™, Windows™, Symbian™, Tizen™, or Bada™. At least part of the program 140, for example, may be pre-loaded on the electronic device 101 during manufacture, or may be downloaded from or updated by an external electronic device (e.g., the electronic device 102 or 104, or the server 108) during use by a user.

The OS 142 may control management (e.g., allocating or deallocation) of one or more system resources (e.g., process, memory, or power source) of the electronic device 101. The OS 142, additionally or alternatively, may include one or more driver programs to drive other hardware devices of the electronic device 101, for example, the input device 150, the sound output device 155, the display device 160, the audio module 170, the sensor module 176, the interface 177, the haptic module 179, the camera module 180, the power management module 188, the battery 189, the communication module 190, the subscriber identification module 196, or the antenna module 197.

The middleware 144 may provide various functions to the application 146 such that a function or information provided from one or more resources of the electronic device 101 may be used by the application 146. The middleware 144 may include, for example, an application manager 201, a window manager 203, a multimedia manager 205, a resource manager 207, a power manager 209, a database manager 211, a package manager 213, a connectivity manager 215, a notification manager 217, a location manager 219, a graphic manager 221, a security manager 223, a telephony manager 225, or a voice recognition manager 227. The application manager 201, for example, may manage the life cycle of the application 146. The window manager 203, for example, may manage one or more graphical user interface (GUI) resources that are used on a screen. The multimedia manager 205, for example, may identify one or more formats to be used to play media files, and may encode or decode a corresponding one of the media files using a codec appropriate for a corresponding format selected from the one or more formats. The resource manager 207, for example, may manage the source code of the application 146 or a memory space of the memory 130.The power manager 209, for example, may manage the capacity, temperature, or power of the battery 189, and determine or provide related information to be used for the operation of the electronic device 101 based at least in part on corresponding information of the capacity, temperature, or power of the battery 189. According to an embodiment, the power manager 209 may interwork with a basic input/output system (BIOS) (not shown) of the electronic device 101.

The database manager 211, for example, may generate, search, or change a database to be used by the application 146. The package manager 213, for example, may manage installation or update of an application that is distributed in the form of a package file. The connectivity manager 215, for example, may manage a wireless connection or a direct connection between the electronic device 101 and the external electronic device. The notification manager 217, for example, may provide a function to notify a user of an occurrence of a specified event (e.g., an incoming call, message, or alert). The location manager 219, for example, may manage locational information on the electronic device 101. The graphic manager 221, for example, may manage one or more graphic effects to be offered to a user or a user interface related to the one or more graphic effects. The security manager 223, for example, may provide system security or user authentication. The telephony manager 225, for example, may manage a voice call function or a video call function provided by the electronic device 101. The voice recognition manager 227, for example, may transmit a user's voice data to the server 108, and receive, from the server 108, a command corresponding to a function to be executed on the electronic device 101 based at least in part on the voice data, or text data converted based at least in part on the voice data. According to an embodiment, the middleware 244 may dynamically delete some existing components or add new components. According to an embodiment, at least part of the middleware 144 may be included as part of the OS 142 or may be implemented as another software separate from the OS 142.

The application 146 may include, for example, a home 251, dialer 253, short message service (SMS)/multimedia messaging service (MMS) 255, instant message (IM) 257, browser 259, camera 261, alarm 263, contact 265, voice recognition 267, email 269, calendar 271, media player 273, album 275, watch 277, health 279 (e.g., for measuring the degree of workout or biometric information, such as blood sugar), or environmental information 281 (e.g., for measuring air pressure, humidity, or temperature information) application. According to an embodiment, the application 146 may further include an information exchanging application (not shown) that is capable of supporting information exchange between the electronic device 101 and the external electronic device. The information exchange application, for example, may include a notification relay application adapted to transfer designated information (e.g., a call, message, or alert) to the external electronic device or a device management application adapted to manage the external electronic device. The notification relay application may transfer notification information corresponding to an occurrence of a specified event (e.g., receipt of an email) at another application (e.g., the email application 269) of the electronic device 101 to the external electronic device. Additionally or alternatively, the notification relay application may receive notification information from the external electronic device and provide the notification information to a user of the electronic device 101. The device management application may control the power (e.g., turn-on or turn-off) or the function (e.g., adjustment of brightness, resolution, or focus) of the external electronic device or some component thereof (e.g., a display device or a camera module of the external electronic device). The device management application, additionally or alternatively, may support installation, delete, or update of an application running on the external electronic device.

Each of elements described in this document may be configured by one or more components, and names of the corresponding elements may be changed according to the type of electronic device. In various embodiments, an electronic device may include at least one of the elements described in this document, and some of the elements may be omitted from the electronic device, or other additional elements may be further included in the electronic device. In addition, some of the elements of the electronic device according to various embodiments may be combined with each other to form one entity, thereby making it possible to perform the functions of the corresponding elements in the same manner as before the combination.

The electronic device according to various embodiments may be one of various types of electronic devices. The electronic devices may include, for example, a portable communication device (e.g., a smart phone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 3:
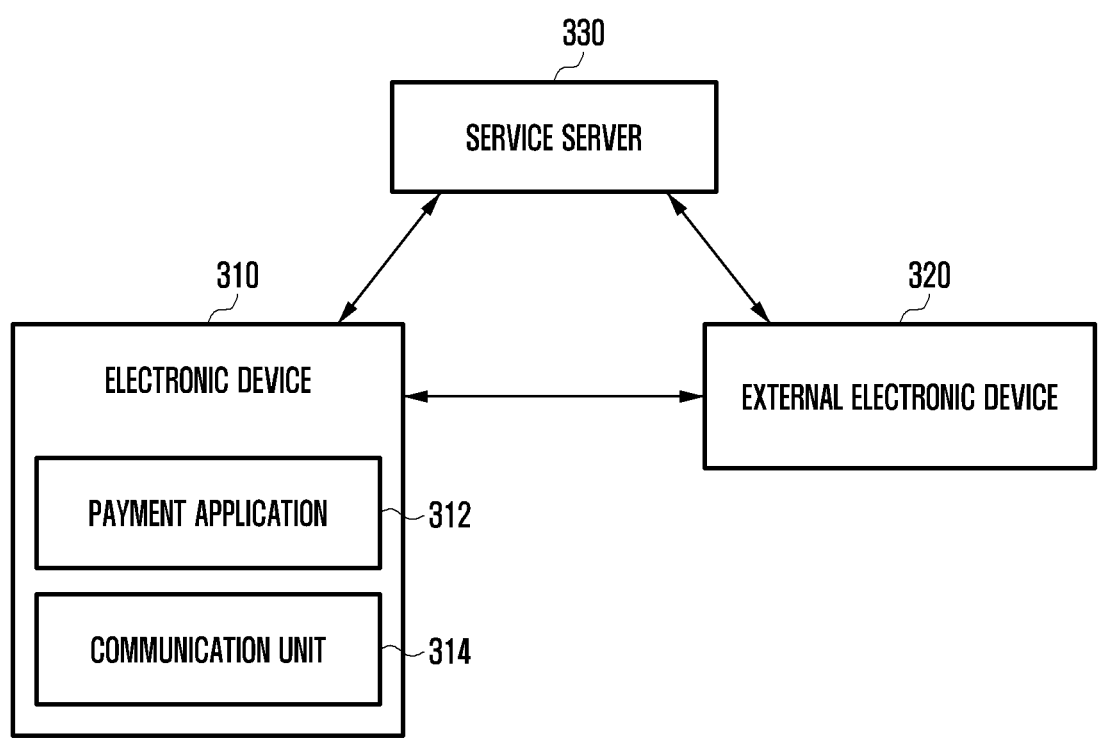
FIG. 3 is a block diagram schematically showing a merchant information providing system according to various embodiments of the disclosure.

FIG. 3 is a block diagram schematically showing a merchant information providing system according to various embodiments of the disclosure.

According to various embodiments, a product information providing system may include an electronic device 310 (e.g., 101 in FIG. 1), an external electronic device 320 (e.g., 102 in FIG. 1), a service server 330 (e.g., 108 in FIG. 1), and the like. The external electronic device 320 may refer to a plurality of external electronic devices (e.g., a first external electronic device, a second external electronic device, etc.). For example, the electronic device 310 may refer to a device (e.g., a smart phone) configured to receive product information, the external electronic device 320 may refer to a device (e.g., a Wi-Fi router) configured to transmit short-range wireless communication information (e.g., Wi-Fi SSID) by representing a merchant, and the service server 330 may refer to a network device for registering/managing, by a mobile payment manager, information on a customer and a merchant which use a payment service.

According to various embodiments, the electronic device 310 may include a payment application 312, a communication unit 314, and the like. The electronic device 310 may receive at least one piece of information for performing a mobile payment service from the service server 330 through the communication unit 314, and perform a payment service. For example, the electronic device 310 may provide, to a user, payment means (e.g., a credit card, a check card, etc.) information, merchant information, product information, event information, coupon information, payment information (e.g., purchase object, purchase amount, and purchase manner, etc.), and the like through the payment application 312.

According to various embodiments, the electronic device 310 may perform mobile payment through the payment application 312. The payment application 312 may include a payment interface, and display information on at least one payment means which can be used for the mobile payment through the payment interface. For example, a card skin including an image representing a payment means and information on the payment means may be displayed on the payment interface. Further, the payment interface may display a fingerprint recognition area required for approval of payment, a notification message area for helping payment, and the like.

According to various embodiments, the electronic device 310 may transmit/receive information on payment or a location of the electronic device through the communication unit 314. For example, the communication unit 314 may include a GPS module, and obtain location information of the electronic device 310. In addition, the communication unit 314 may communicate with the external device 320 or the service server 330 through at least one of a cellular module, a Wi-Fi module, a BT module, and an NFC module, and transmit or receive at least one piece of information (e.g., Wi-Fi SSID information corresponding to the external electronic device 320, merchant information corresponding to a Wi-Fi SSID, and product information provided by a merchant, etc.) related to mobile payment.

According to various embodiments, the external electronic device 320 may register information on a merchant represented by the external electronic device 320, a product, an advertisement, an event, and a coupon in the service server 330 operated by the mobile payment manager. The external electronic device 320 may receive identification information on the merchant represented by the external electronic device 320 from the service server 330, based on the registration. For example, identification information (e.g., a Wi-Fi SSID) of the external electronic device 320 may be information generated based on a MAC address of the external electronic device 320. Accordingly, the MAC address of the external electronic device 320 and the identification information of the external electronic device 320 may be matched 1 to 1, and the identification information of the external electronic device 320 may be unique information indicating the external electronic device 320. The external electronic device 320 may transmit identification information received from the service server 330 to the electronic device 310, and allow the electronic device 310 to receive at least one piece of information on the external electronic device 320 from the service server 330.

According to various embodiments, the service server 330 may receive at least one piece of information on a merchant represented by the external electronic device 320 from the external electronic device 320, and register the corresponding merchant as a member of the mobile payment service (e.g., including a mobile product information providing service). The service server 330 may provide at least one piece of information on the external electronic device 320 registered in the service server 330 to the electronic device 310, based on a request of the electronic device 310.

Figure 4A:
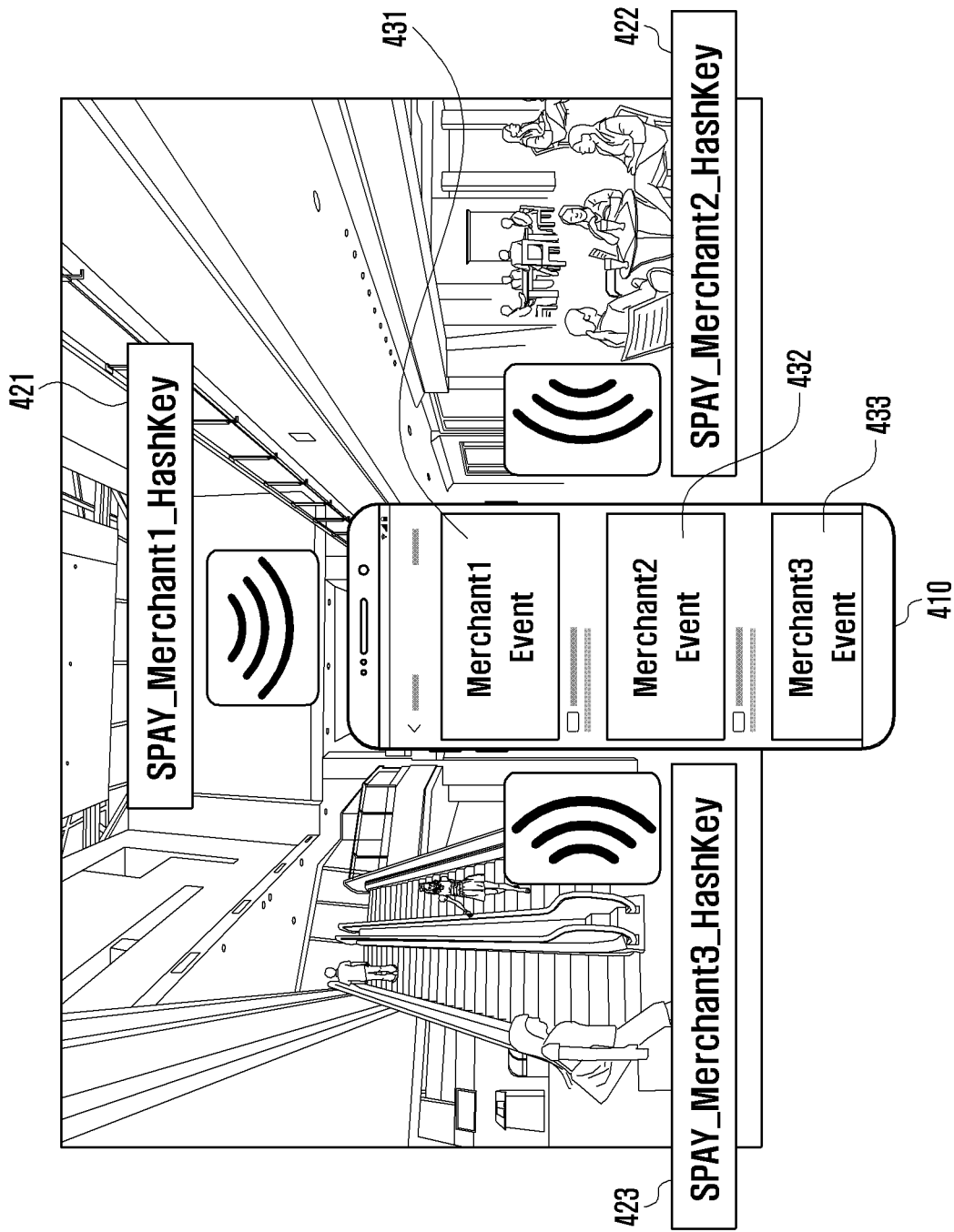
FIG. 4A schematically illustrates a method for receiving, by an electronic device, product information provided by each merchant from a plurality of merchants according to various embodiments of the disclosure.

FIG. 4A schematically illustrates a method for receiving, by an electronic device, product information provided by each merchant from a plurality of merchants according to various embodiments of the disclosure.

According to various embodiments, an electronic device 410 (e.g., 310 in FIG. 3) may be located in a shopping mall in which a plurality of merchants are located. The electronic device 410 may receive identification information corresponding to each merchant from the plurality of merchants through a Wi-Fi module. For example, the identification information may be a Wi-Fi service set identifier (SSID) transmitted from an external electronic device (e.g., 320 in FIG. 3) corresponding to a merchant.

According to various embodiments, a first external electronic device corresponding to a first merchant may emit a first Wi-Fi SSID referred to as SPAY_Merchant1_Hashkey 421, a second external electronic device corresponding to a second merchant may emit a second Wi-Fi SSID referred to as SPAY_Merchant2_Hashkey 422, and a third external electronic device corresponding to a third merchant may emit a third Wi-Fi SSID referred to as SPAY_Merchant3_Hashkey 423. For example, the electronic device 410 may receive the first to third Wi-Fi SSIDs through the Wi-Fi module. The electronic device 410 may receive a first merchant event 431, a second merchant event 432, and a third merchant event 433 from a service server (e.g., 330 in FIG. 3), based on the received Wi-Fi SSIDs, and display a plurality of events on the display device 160. Accordingly, a user of the electronic device 410 can identify information on a coupon, an event, and a product sold in each merchant without having to visit the plurality of merchants individually, and thus obtain multiple pieces of information more easily and quickly.

Figure 4B:
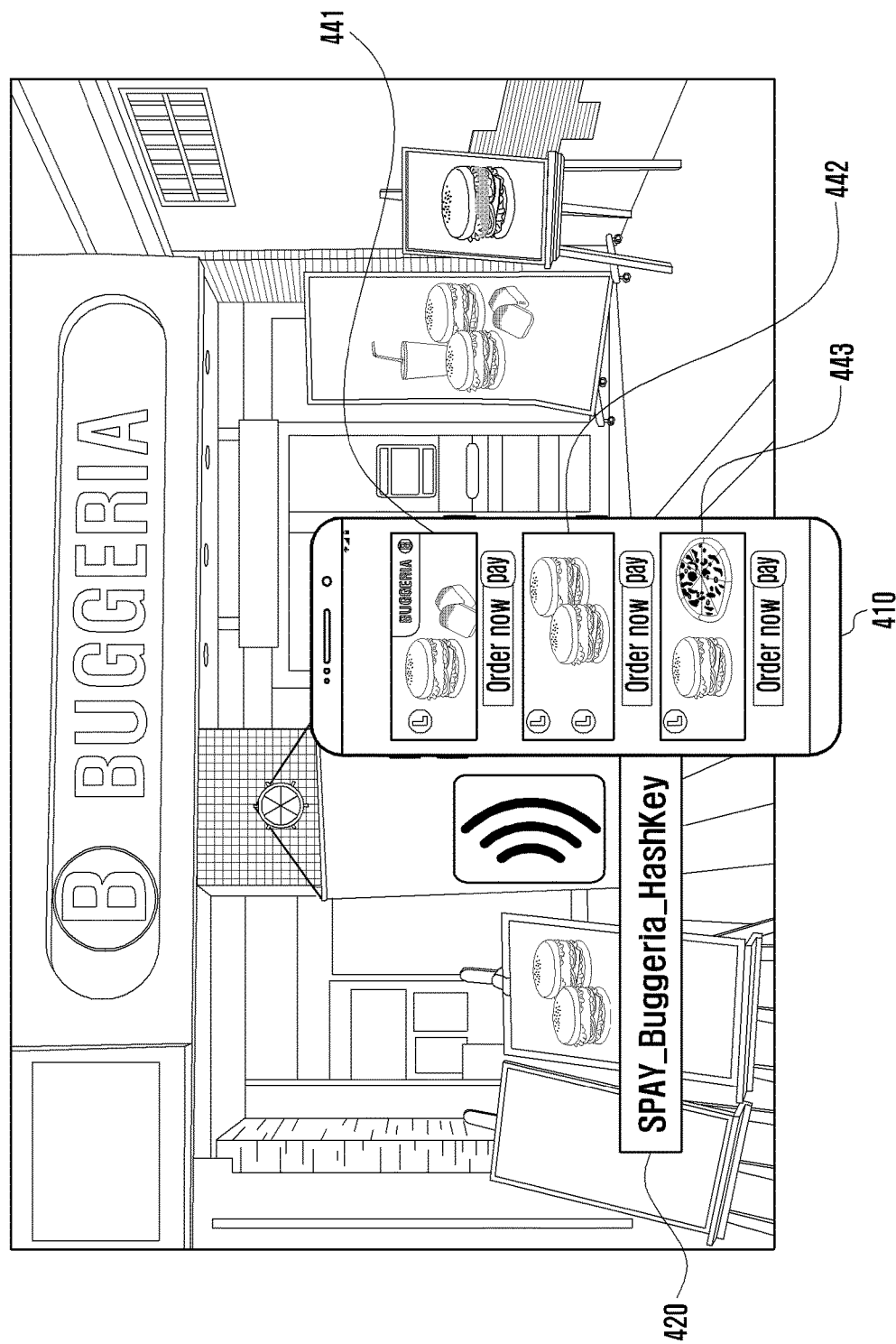
FIG. 4B schematically illustrates a method for receiving, by an electronic device, product information provided by a corresponding merchant from a specific merchant according to various embodiments of the disclosure.

FIG. 4B schematically illustrates a method for receiving, by an electronic device, product information provided by a corresponding merchant from a specific merchant according to various embodiments of the disclosure.

According to various embodiments, the electronic device 410 (e.g., 310 in FIG. 3) may be located inside a fast food store or located outside and adjacent to the fast food store. For example, a user of the electronic device 410 may be located in a parking lot around the fast food store. The electronic device 410 may receive identification information corresponding to the fast food store through the Wi-Fi module. For example, the identification information may be a Wi-Fi service set identifier (SSID) transmitted from an external electronic device (e.g., 320 in FIG. 3) corresponding to the fast food store.

According to various embodiments, the external electronic device corresponding to the fast food store may emit a Wi-Fi SSID referred to as SPAY_Buggeria_Hashkey 420. For example, the electronic device 410 may receive a Wi-Fi SSID of the fast food store through the Wi-Fi module. The electronic device 410 may receive at least one piece of information provided by the fast food store from the service server (e.g., 330 in FIG. 3), based on the received Wi-Fi SSID, and display, on the display device 160, the received at least one piece of information. For example, the electronic device 410 may display information 441, 442, and 443 relating to menus and orders provided by the fast food store. Accordingly, the user of the electronic device 410 can conveniently and quickly order a menu item desired by the user, in the parking lot around the fast food store, without going through an employee or an unmanned order device, and without entering the fast food store.

Figure 5:
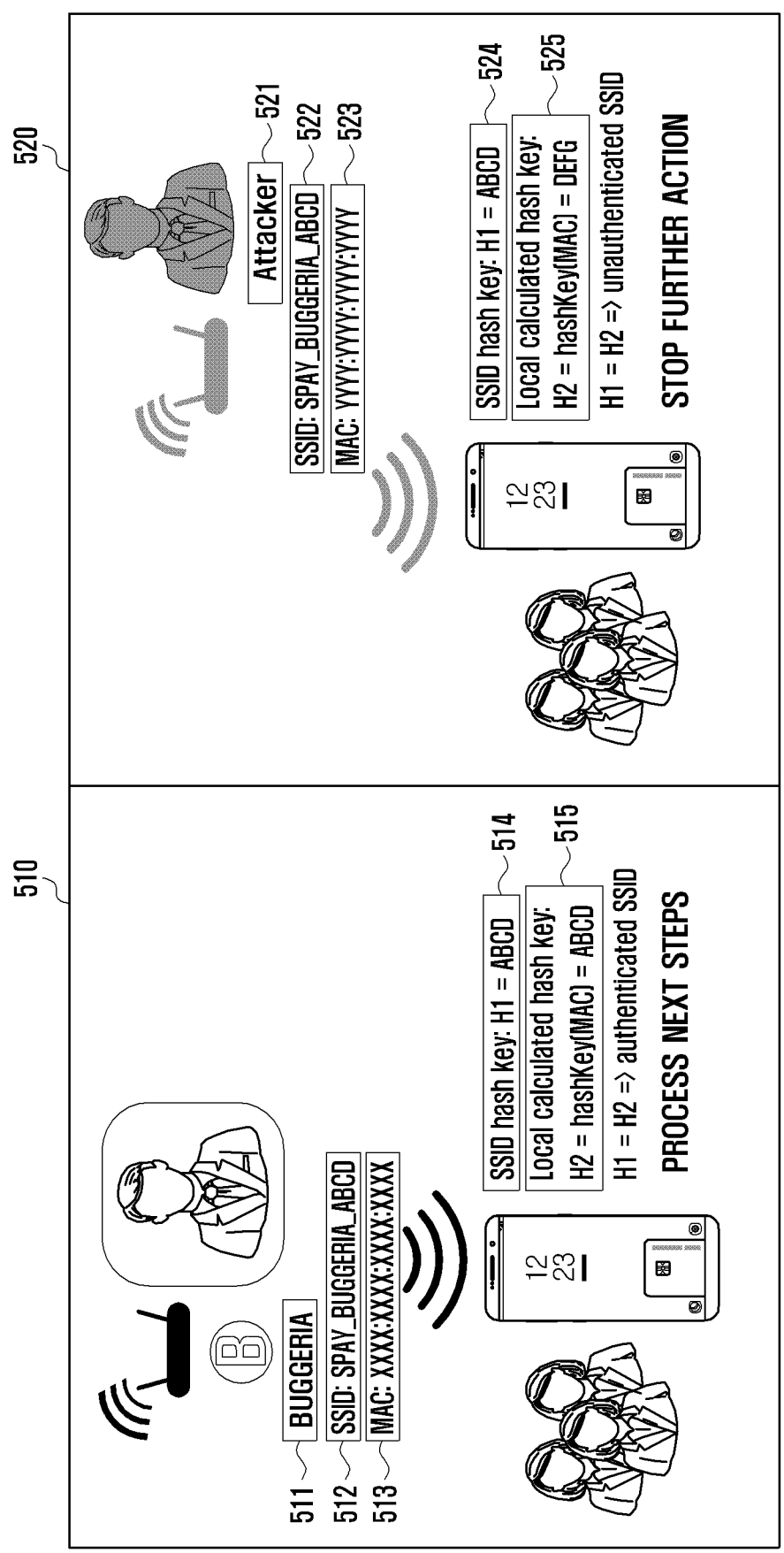
FIG. 5 illustrates a method for verifying, by an electronic device, identification information corresponding to a merchant providing product information according to various embodiments of the disclosure.

FIG. 5 illustrates a method for verifying, by an electronic device, identification information corresponding to a merchant providing product information according to various embodiments of the disclosure.

According to various embodiments, referring to reference numeral 510, a merchant (e.g., BUGGERIA 511) may use a Wi-Fi SSID 512 referred to as SPAY_BUGGERIA_ABCD. Further, an external electronic device (e.g., a Wi-Fi router) of the merchant 511 may have a MAC address 513 called XXXX:XXXX:XXXX:XXXX. The Wi-Fi SSID 512 of the merchant may include data generated based on the MAC address 513 of the external electronic device. For example, the Wi-Fi SSID 512 of the merchant may be unique identification information of the merchant 511 assigned from a mobile payment manager operating a service server (e.g., 330 in FIG. 3).

According to various embodiments, the Wi-Fi SSID 512 corresponding to the merchant 511 may include information on a first hash key (H1) 514. For example, the first hash key 514 may be a value calculated through a hash key generation algorithm of the service server (e.g., 330 in FIG. 3), based on the MAC address 513 of the merchant 511. A specific embodiment of assigning a Wi-Fi SSID including a hash key to an external electronic device (e.g., 320 in FIG. 3) by the service server (e.g., 330 in FIG. 3) is described with reference to FIG. 6.

According to various embodiments, the electronic device (e.g., 310 in FIG. 3) may receive the Wi-Fi SSID 512 corresponding to the merchant 511, and perform verification for the received Wi-Fi SSID 512. If information corresponding to the Wi-Fi SSID is received without verification for the Wi-Fi SSID, there is a risk of indiscriminately receiving malware, spam messages, or the like. For example, the electronic device (e.g., 310 in FIG. 3) may generate a second hash key (H2) 515, based on the MAC address 513 corresponding to the received Wi-Fi SSID 512. In this case, a hash key generation algorithm used by the electronic device (e.g., 310 in FIG. 3) may be the same algorithm as an algorithm for generating the first hash key 514 in the service server (e.g., 330 in FIG. 3), and the corresponding algorithm may be stored in the memory 130 of the electronic device or installed in association with the program 140. The electronic device (e.g., 310 in FIG. 3) may identify identification information by connecting to the service server (e.g., 330 in FIG. 3) whenever receiving the identification information from the external electronic device (e.g., 320 in FIG. 3). However, in order to reduce wireless data or battery consumption, it may be appropriate to store or install the algorithm in the electronic device (e.g., 310 in FIG. 3).

According to various embodiments, the electronic device (e.g., 310 in FIG. 3) may compare the first hash key (H1) 514 and the second hash key (H2) 515, and determine that verification succeeds when the first hash key and the second hash key are the same. Accordingly, the electronic device (e.g., 310 in FIG. 3) may request the service server (e.g., 330 in FIG. 3) to transmit at least one piece of information corresponding to the merchant 511.

According to various embodiments, referring to reference numeral 520, an attacker (e.g., attacker 521) may use a Wi-Fi SSID 522 referred to as SPAY_BUGGERIA_ABCD, which is the same as the Wi-Fi SSID 512 used by the merchant 511. This is because the Wi-Fi SSID can be changed freely according to a configuration of the external electronic device (e.g., 320 in FIG. 3). However, since a MAC address (e.g., YYYY:YYYY:YYYY:YYYY 523) of the attacker 521 is a value uniquely assigned to an external electronic device of the attacker 521, and thus cannot have the same value as the MAC address (e.g., XXXX:XXXX:XXXX:XXXX 513) of the merchant 511.

According to various embodiments, the Wi-Fi SSID 522 corresponding to the merchant 521 may include information on a first hash key (H1) 524. For example, since the attacker 521 has illegally used the Wi-Fi SSID 512 of the merchant 511, the attacker 521 may have the first hash key 524 which is the same as the first hash key 514 of the merchant 511.

According to various embodiments, the electronic device (e.g., 310 in FIG. 3) may receive the Wi-Fi SSID 522 corresponding to the attacker 521, and perform verification for the received Wi-Fi SSID 522. For example, the electronic device (e.g., 310 in FIG. 3) may generate a second hash key (H2) 525, based on the MAC address 523 corresponding to the received Wi-Fi SSID 522. In this case, the hash key generation algorithm used by the electronic device (e.g., 310 in FIG. 3) may be the same algorithm as the algorithm for generating the first hash key 514 in the service server (e.g., 330 in FIG. 3), and the corresponding algorithm may be stored in the memory 130 of the electronic device or installed in association with the program 140. The electronic device (e.g., 310 in FIG. 3) may identify identification information by connecting to the service server (e.g., 330 in FIG. 3) whenever receiving the identification information from the external electronic device (e.g., 320 in FIG. 3). However, in order to reduce wireless data or battery consumption, it may be appropriate to store or install the algorithm in the electronic device (e.g., 310 in FIG. 3).

According to various embodiments, the electronic device (e.g., 310 in FIG. 3) may compare the first hash key (H1) 524 and the second hash key (H2) 525, and determine that verification fails when the first hash key (e.g., ABCD) and the second hash key (e.g., DEFG) are not the same, and thus may not proceed with an additional procedure. Accordingly, the electronic device (e.g., 310 in FIG. 3) can prevent the service server (e.g., 330 in FIG. 3) from receiving malware, spam messages, or the like from the attacker 521.

Figure 6:
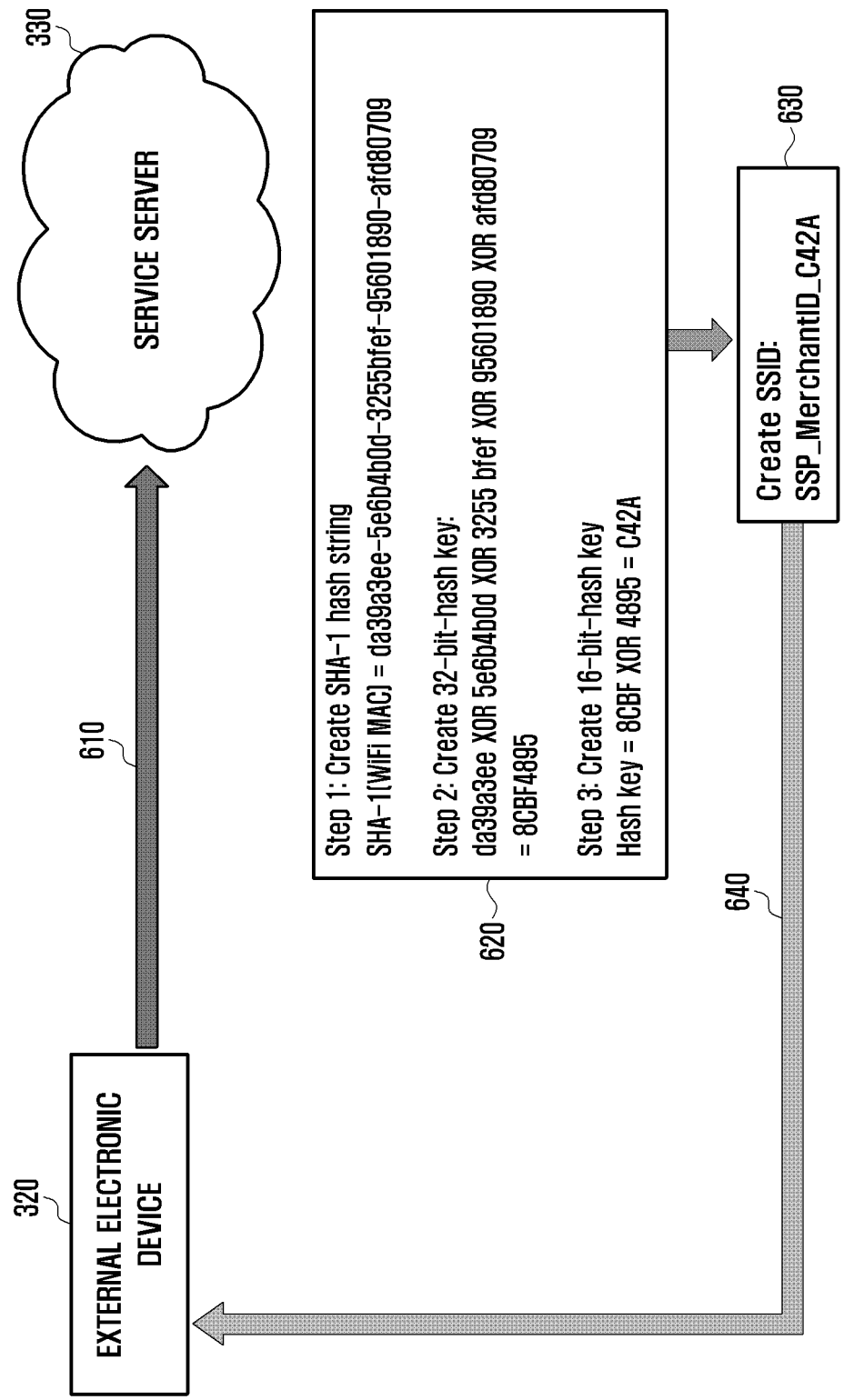
FIG. 6 illustrates a method for registering merchant-related information in a service server by an external electronic device corresponding to a merchant, and receiving identification information from the service server according to various embodiments of the disclosure.

FIG. 6 illustrates a method for registering merchant-related information in a service server by an external electronic device corresponding to a merchant, and receiving identification information from the service server according to various embodiments of the disclosure.

According to various embodiments, in operation 610, the external electronic device 320 may transmit at least one piece of information on a merchant represented by the external electronic device 320 to the service server 330, and request registration of the merchant. The information transmitted by the external electronic device 320 may include a MAC address of the external electronic device 320 in addition to a merchant name, a business type, a business registration number, and the like.

According to various embodiments, in operation 620, the service server 330 may generate a Wi-Fi SSID of the external electronic device 320 by putting the MAC address of the external electronic device 320 into a hash key generation algorithm. For example, a hash key generation algorithm of the service server 330 may use an XOR operator. In a case where the MAC address of the external electronic device 320 is a string of a total of 40 bytes (e.g., da39a3ee-5e6b4b0d-3255bfef-95601890-afd80709), when calculation is performed using the XOR operator per 8 bytes, the string may be abbreviated to a string of a total of 8 bytes (e.g., 8CBF4895). In this case, when the first 4 bytes (e.g., 8CBF) of 8 bytes and the remaining 4 bytes (e.g., 4895) are calculated again using the XOR operator, a value of C42A may be calculated. Accordingly, the service server 330 may assign the C42A as a hash key of the external electronic device 320. In addition, the service server 330 may register the merchant represented by the external electronic device 320, based on the information transmitted from the external electronic device 320. Meanwhile, the hash key generation algorithm using the above-mentioned XOR operator multiple times is merely one embodiment disclosed in the disclosure, and the service server 330 may generate a hash key corresponding to the external electronic device 320 by putting the MAC address into any algorithm.

According to various embodiments, in operation 630, the service server 330 may generate the Wi-Fi SSID of the external electronic device 320, based on the generated hash key (e.g., C42A). For example, the Wi-Fi SSID may be a value of a combination of an SSP which stands for a mobile payment service, a merchantID which stands for a merchant, and C42A which is a hash key.

According to various embodiments, in operation 640, the service server 330 may transmit the generated Wi-Fi SSID (e.g., SSP_MerchantID_C42A) to the external electronic device 320, and allow the external electronic device 320 to change the existing Wi-Fi SSID to the newly generated Wi-Fi SSID. For example, a notification or pop-up menu relating to whether to change to the Wi-Fi SSID assigned by the service server 330 may be displayed on the external electronic device 320 or at least one electronic device associated with the external electronic device 320. For another example, the external electronic device 320 may automatically change the Wi-Fi SSID of the external electronic device 320 in response to receiving the Wi-Fi SSID from the service server 330.

Figure 7:
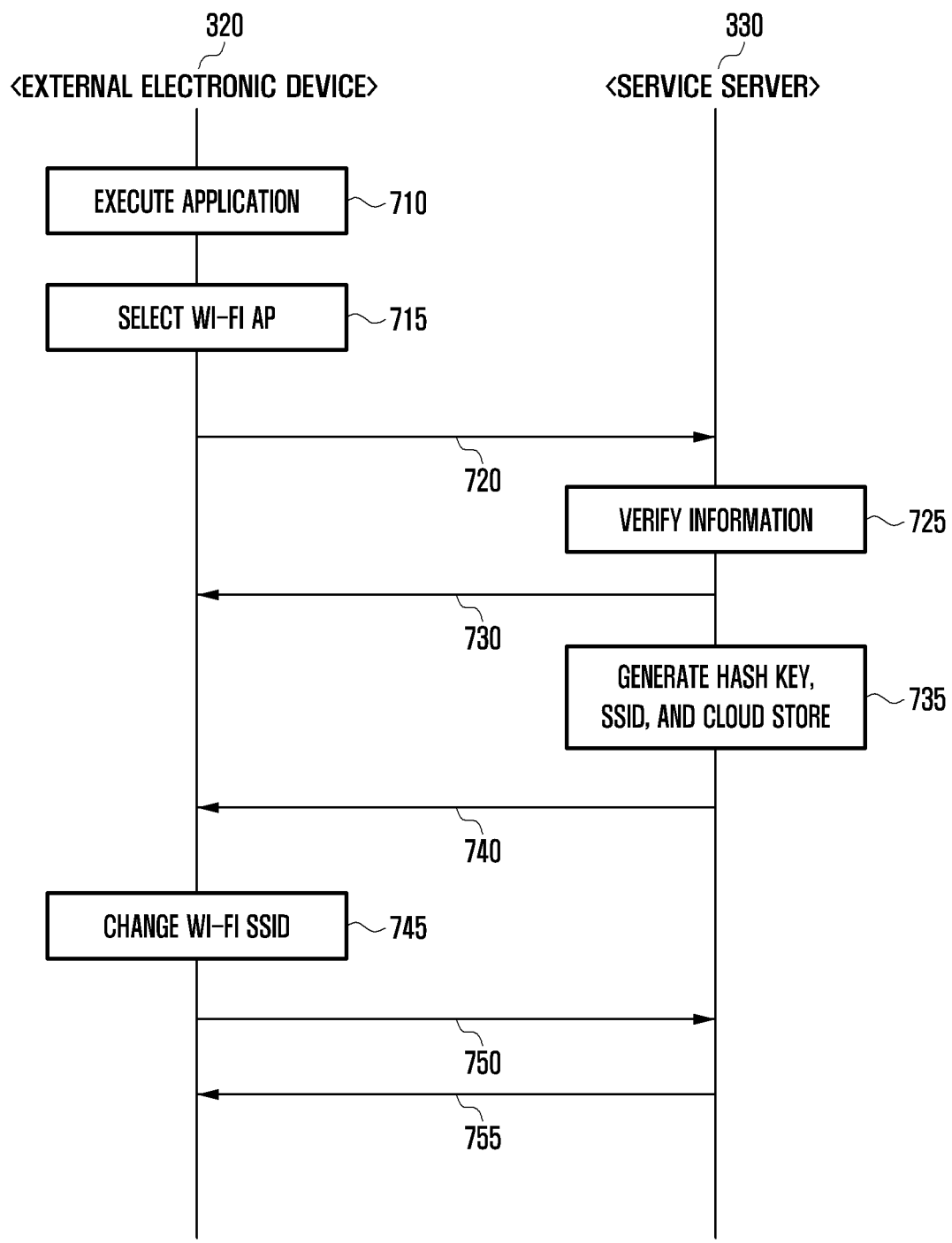
FIG. 7 is a flowchart illustrating a method for registering merchant-related information in a service server through an external electronic device corresponding to a merchant, and receiving identification information from the service server according to various embodiments of the disclosure.

FIG. 7 is a flowchart illustrating a method for registering merchant-related information in a service server through an external electronic device corresponding to a merchant, and receiving identification information from the service server according to various embodiments of the disclosure.

According to various embodiments, the external electronic device 320 or other external electronic devices associated with the external electronic device 320 may execute an application related to a mobile payment service in operation 710. In this case, the external electronic device 320 may refer to a point of sale (POS) terminal of a merchant, and other external electronic devices associated with the external electronic device 320 may refer to a desktop PC, a laptop PC, a smart phone, and the like. Hereinafter, the external electronic device 320 or other external electronic devices associated with the external electronic device 320 are collectively described as the external electronic device 320.

According to various embodiments, in operation 715, the external electronic device 320 may select a Wi-Fi access point (AP). For example, the external electronic device 320 may scan for Wi-Fi APs through an application and select a specific Wi-Fi AP from among the Wi-Fi APs to access the network 199. In addition, the external electronic device 320 may obtain a MAC address corresponding to the selected Wi-Fi AP. For another example, the external electronic device 320 may access the Wi-Fi AP in a state where the external electronic device has obtained the MAC address in advance.

According to various embodiments, in operation 720, the external electronic device 320 may transmit at least one piece of information on a merchant represented by the external electronic device 320 to the service server 330. For example, the information transmitted by the external electronic device 320 may include a MAC address of the external electronic device 320 in addition to a merchant name, a business type, a business registration number, and the like.

According to various embodiments, in operation 725, the service server 330 may verify the at least one piece of information received from the external electronic device 320. For example, an operator providing a mobile payment service may verify whether the information received from the external electronic device 320 is accurate by verifying business information and the like.

According to various embodiments, in operation 730, when verification in operation 725 is completed, the service server 330 may transmit a result of the verification to the external electronic device 320.

According to various embodiments, in operation 735, the service server 330 may generate a hash key, a Wi-Fi SSID, and a cloud store which correspond to the external electronic device 320. For example, the cloud store is an online virtual space and may refer to an area for uploading, storing, and downloading at least one piece of information on a merchant represented by the external electronic device 320. For reference, the contents of the hash key and the Wi-Fi SSID are described with reference to FIGS. 5 and 6.

According to various embodiments, in operation 740, the service server 330 may transmit information on the Wi-Fi SSID and the cloud store to the external electronic device.

According to various embodiments, in operation 745, the external electronic device 320 may configure a Wi-Fi SSID received from the service server 330 as a Wi-Fi SSID of the external electronic device 320. For example, a notification or pop-up menu relating to whether to change to the Wi-Fi SSID assigned by the service server 330 may be displayed on the external electronic device 320. For another example, the external electronic device 320 may automatically change the Wi-Fi SSID of the external electronic device 320 in response to receiving the Wi-Fi SSID from the service server 330.

According to various embodiments, in operation 750, the external electronic device 320 may transmit event, advertisement, and menu information of a merchant to the service server 330. For example, the event, advertisement, and menu information of the merchant transmitted by the external electronic device 320 may be uploaded and stored in the cloud store of the service server 330.

According to various embodiments, in operation 755, the service server 330 may transmit a message informing the external electronic device 320 of a result of the information storage. For example, the service server 330 may transmit, to the external electronic device 320, a message that at least one piece of information has been successfully transmitted to the cloud store or that some pieces of the information have failed to be uploaded.

Figure 8:
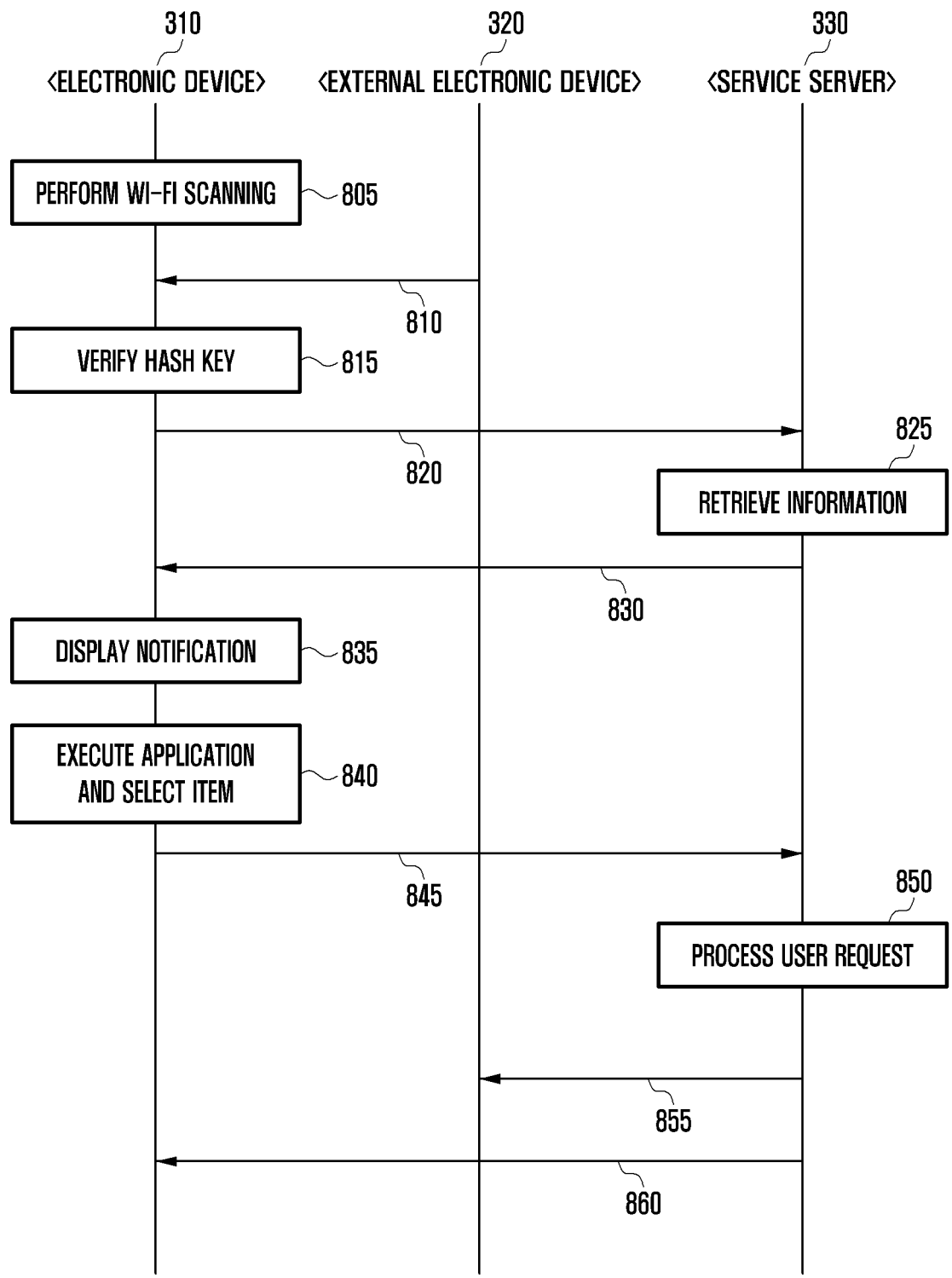
FIG. 8 is a flowchart illustrating a method for generating an event by an electronic device, based on information preemptively provided by a merchant according to various embodiments of the disclosure.

FIG. 8 is a flowchart illustrating a method for generating an event by an electronic device, based on information preemptively provided by a merchant according to various embodiments of the disclosure. Unlike FIG. 9, in the case of FIG. 8, disclosed is a method for receiving at least one piece of merchant information having undergone an authentication procedure even when a user of the electronic device 310 does not preemptively execute an application.

According to various embodiments, in operation 805, the electronic device 310 may scan for a Wi-Fi signal around the electronic device 310 through a Wi-Fi module.

According to various embodiments, in operation 810, the electronic device 310 may receive information on a Wi-Fi SSID and a MAC address corresponding to the external electronic device 320 from a signal emitted by the external electronic device 320. For example, when there are a plurality of external electronic devices 320 emitting signals, the electronic device 310 may receive information on a plurality of Wi-Fi SSIDs and MAC addresses from the plurality of external electronic devices 320.

According to various embodiments, in operation 815, the electronic device 310 may verify a hash key of the external electronic device 320 by using the information on the Wi-Fi SSID and the MAC address, the information being received from the external electronic device 320. A specific embodiment of verifying the hash key of the external electronic device 320 by the electronic device 310 is described with reference to FIG. 5.

According to various embodiments, in operation 820, when the hash key of the external electronic device 320 is verified, the electronic device 310 may request the service server 330 to transmit at least one piece of information on a merchant represented by the external electronic device 320. For example, the electronic device 310 may request the service server 330 to transmit at least one piece of information stored in a cloud store corresponding to the verified Wi-Fi SSID.

According to various embodiments, in operation 820, even when the hash key of the external electronic device 320 is verified, the electronic device 310 may not request the service server 330 to transmit the at least one piece of information on the merchant represented by the external electronic device 320. For example, in the case of a specific merchant or a specific event provided by the specific merchant, a user of the electronic device 310 may no longer want to receive and identify information. The user of the electronic device 310 may store such a personal preference in the electronic device 310, and the electronic device 310 may select information to be provided to the user, based on the personal preference. For example, information on the personal preference may include at least one piece of information on the type of merchant, product, or service, a preferred brand, a preferred region or place, a preferred information reception time, and the like. Meanwhile, the information on the personal preference may be stored in the service server 330 as well as the electronic device 310, and in spite of a request of the electronic device 310, the service server 330 may not transmit information on a merchant, based on personal preference information stored in the server.

According to various embodiments, in operation 825, the service server 330 may retrieve information corresponding to the Wi-Fi SSID of the external electronic device 320 requested by the electronic device 310. For example, the service server 330 may search for a cloud store corresponding to a Wi-Fi SSID, transmission of information of which the electronic device 310 has requested.

According to various embodiments, in operation 830, the service server 330 may transmit the at least one piece of information on the merchant represented by the external electronic device 320 to the electronic device 310. For example, the service server 330 may transmit event, advertisement, and menu information of the merchant stored in a cloud store of the external electronic device 320 to the electronic device 310.

According to various embodiments, in operation 835, when the electronic device 310 receives the at least one piece of information on the merchant represented by the external electronic device 320 from the service server 330, the electronic device 310 may display a notification such that the user of the electronic device 310 can identify the information. Accordingly, even when the user of the electronic device 310 does not recognize the information separately, the electronic device 310 may receive the at least one piece of information on the merchant from the service server 330, and provide the received information to the user.

According to various embodiments, in operation 840, the electronic device 310 may receive, from the user, an input for executing an application and selecting a specific item from among provided items. For example, the user of the electronic device 310 may identify the notification provided in operation 835 and execute a mobile payment application in response thereto. For example, the electronic device 310 may receive an input for selecting a specific item from among provided items (e.g., an event, a coupon, a menu, and the like relating to the merchant).

According to various embodiments, in operation 845, the electronic device 310 may notify the service server 330 that the user of the electronic device 310 has selected a specific item.

According to various embodiments, in operation 850, the service server 330 may process a user request received from the electronic device 310. For example, the user request may include a request to the merchant for purchasing a product or service, a request for a coupon relating to a product or service, and the like. The service server 330 may directly process a user request (e.g., coupon issuance) which can be processed by the service server 330, and may allow the external electronic device 320 to process a user request (e.g., food order) which can be processed through the external electronic device 320.

According to various embodiments, in operation 855, the service server 330 may notify the external electronic device 320 that an event based on the user request has been registered. For example, when the user orders a specific product, the service server 330 may notify the external electronic device 320 to allow the merchant to prepare the specific product requested by the user.

According to various embodiments, in operation 860, the service server 330 may transmit, to the electronic device 310, feedback relating to the request of the user in operation 845. For example, the service server 330 may transmit a message informing the user of the issuance of a coupon and an order result for the specific product (e.g., reception completion, expected waiting time, out of stock, etc.).

Figure 9:
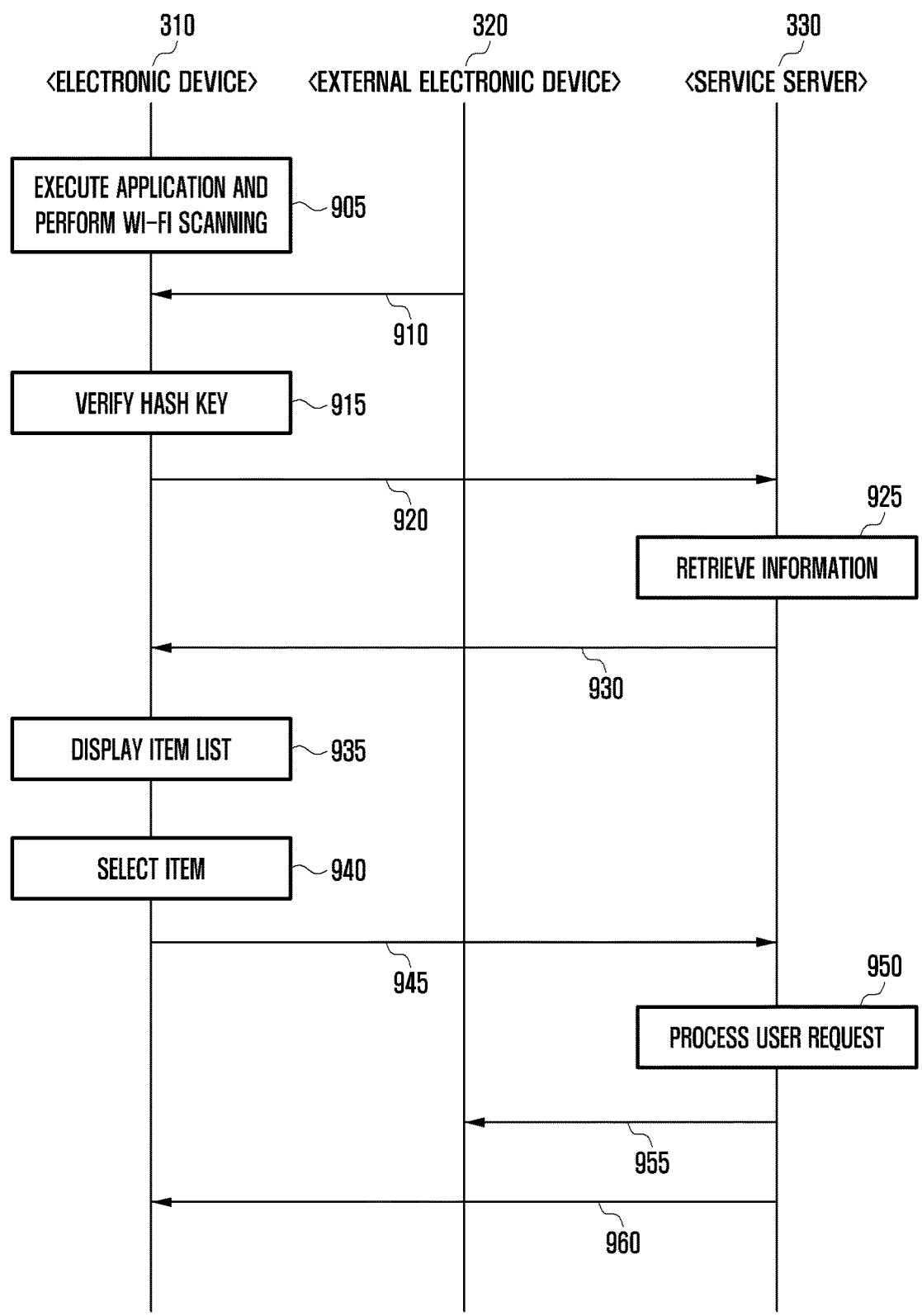
FIG. 9 is a flowchart illustrating a method for preemptively selecting a merchant by a user and generating an event by using an electronic device according to various embodiments of the disclosure.

FIG. 9 is a flowchart illustrating a method for preemptively selecting a merchant by a user and generating an event by using an electronic device according to various embodiments of the disclosure. In the case of FIG. 9, unlike FIG. 8, disclosed is a method for executing an application under a user's deliberate control and receiving merchant information.

According to various embodiments, in operation 905, the electronic device 310 may execute a mobile payment application and scan for a Wi-Fi signal around the electronic device 310 through a Wi-Fi module. For example, a user of the electronic device 310 may be located within a merchant or located adjacent to the merchant, and may intend to order a product without the help of an employee. Accordingly, the user may preemptively execute the mobile payment application, and receive at least one piece of information on a corresponding merchant to order a specific product provided by the corresponding merchant.

According to various embodiments, in operation 910, the electronic device 310 may receive information on a Wi-Fi SSID and a MAC address corresponding to the external electronic device 320 from a signal emitted by the external electronic device 320. For example, the electronic device 310 may receive the information on the Wi-Fi SSID and the MAC address of the signal emitted by the external electronic device 320 corresponding to the merchant where the user is located.

According to various embodiments, in operation 915, the electronic device 310 may verify a hash key of the external electronic device 320 by using the information on the Wi-Fi SSID and the MAC address received from the external electronic device 320. A specific embodiment of verifying the hash key of the external electronic device 320 by the electronic device 310 is described with reference to FIG. 5.

According to various embodiments, in operation 920, when the hash key of the external electronic device 320 is verified, the electronic device 310 may request the service server 330 to transmit at least one piece of information on a merchant represented by the external electronic device 320. For example, the electronic device 310 may request the service server 330 to transmit at least one piece of information stored in a cloud store corresponding to the verified Wi-Fi SSID.

According to various embodiments, in operation 925, the service server 330 may retrieve information corresponding to the Wi-Fi SSID of the external electronic device 320 requested by the electronic device 310. For example, the service server 330 may search for a cloud store corresponding to a Wi-Fi SSID, transmission of information of which the electronic device 310 has requested.

According to various embodiments, in operation 930, the service server 330 may transmit the at least one piece of information on the merchant represented by the external electronic device 320 to the electronic device 310. For example, the service server 330 may transmit event, advertisement, and menu information of the merchant stored in a cloud store of the external electronic device 320 to the electronic device 310.

According to various embodiments, in operation 935, the electronic device 310 may receive at least one piece of information provided by the merchant represented by the external electronic device 320 from the service server 330, and display a list of items to the user of the electronic device 310.

According to various embodiments, in operation 940, the electronic device 310 may receive a user's input for selecting a specific item from among the list of the items. For example, the electronic device 310 may receive, from the user, an input for selecting a specific item from among provided items (e.g., an event, a coupon, a menu, and the like relating to the merchant).

According to various embodiments, in operation 945, the electronic device 310 may notify the service server 330 that the user of the electronic device 310 has selected a specific item.

According to various embodiments, in operation 950, the service server 330 may process a user request received from the electronic device 310. For example, the user request may include a request to the merchant for purchasing a product or service, a request for a coupon relating to a product or service, and the like. The service server 330 may directly process a user request (e.g., coupon issuance) which can be processed by the service server 330, and may allow the external electronic device 320 to process a user request (e.g., food order) which can be processed through the external electronic device 320.

According to various embodiments, in operation 955, the service server 330 may notify the external electronic device 320 that an event based on the user request has been registered. For example, when the user orders a specific product, the service server 330 may notify the external electronic device 320 to allow the merchant to prepare the specific product requested by the user.

According to various embodiments, in operation 960, the service server 330 may transmit, to the electronic device 310, feedback relating to the request of the user in operation 945. For example, the service server 330 may transmit a message informing the user of the issuance of a coupon and an order result for the specific product (e.g., reception completion, expected waiting time, out of stock, etc.).

Figure 10:
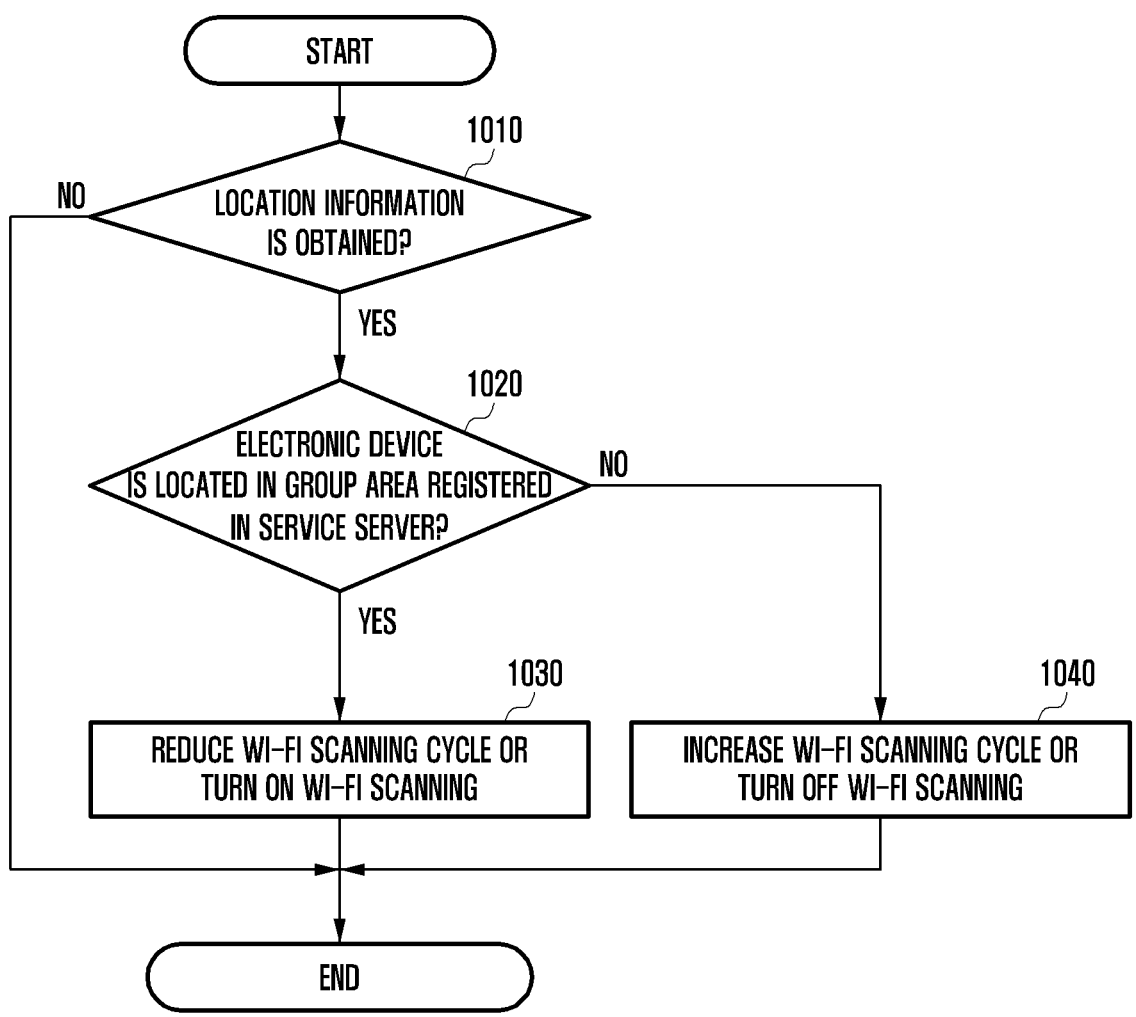
FIG. 10 is a flowchart illustrating a method for controlling, by an electronic device, a cycle of scanning for merchant information, based on location information of the electronic device and a group area registered in a service server according to various embodiments of the disclosure.

FIG. 10 is a flowchart illustrating a method for controlling, by an electronic device, a cycle of scanning for merchant information, based on location information of the electronic device and a group area registered in a service server according to various embodiments of the disclosure.

Various embodiments disclosed herein relate to a method for providing merchant information to a user of an electronic device, based on scanning for a Wi-Fi signal. Accordingly, this is premised upon activation of a Wi-Fi module of an electronic device. In the case of an electronic device such as a portable terminal, there may be a difficulty in leaving on a Wi-Fi module at all times due to the limitation of a battery. Accordingly, a method for turning on/off a Wi-Fi scan according to a predetermined cycle or interval in a state where the Wi-Fi module is not activated in the electronic device may be required. Furthermore, the electronic device may control the predetermined cycle or interval, based on location information of the electronic device. For example, in case that the electronic device is located in a region where merchants subscribed to a mobile payment service are densely located, the predetermined cycle or interval is reduced, so that the electronic device may receive Wi-Fi SSID information more frequently. For another example, in case that the electronic device is located in a region where merchants subscribed to the mobile payment service are sparsely located, the predetermined cycle or interval is increased to prevent the electronic device from receiving Wi-Fi SSID information frequently. Accordingly, the electronic device can reduce power consumption in the electronic device.

According to various embodiments, in operation 1010, the electronic device 310 may obtain location information of the electronic device 101. For example, the electronic device 101 may obtain information on a region where the electronic device 101 is located through a GPS module, a subscriber identity module, or the like of the electronic device 101.

According to various embodiments, in operation 1020, the electronic device 310 may identify whether the electronic device 310 is located in a group area registered in the service server 330, based on the obtained location information. For example, whether the electronic device 310 is located in the group area registered in the service server 330 may be identified by comparing location information of the electronic device 310 with database (e.g., information on the group area, see FIG. 12) stored in the electronic device 310 or the service server 330. If it is determined based on the database stored in the service server 330, the electronic device 310 and the service server 330 may identify whether the electronic device 310 is located in the group area registered in the service server 330 through a separate data transmission/reception process.

According to various embodiments, in operation 1030, the electronic device 310 may reduce a Wi-Fi scanning cycle of the electronic device 310 when it is determined that the electronic device 310 is located in the group area registered in the service server 330. In this case, Wi-Fi scanning may be attempted more frequently, so that a variety of information may be provided to the electronic device 310 quickly. For another example, when it is determined that the electronic device 310 is located in the group area registered in the service server 330 in a Wi-Fi scanning off state, the electronic device 310 may turn on Wi-Fi scanning of the electronic device 310.

Figure 11:
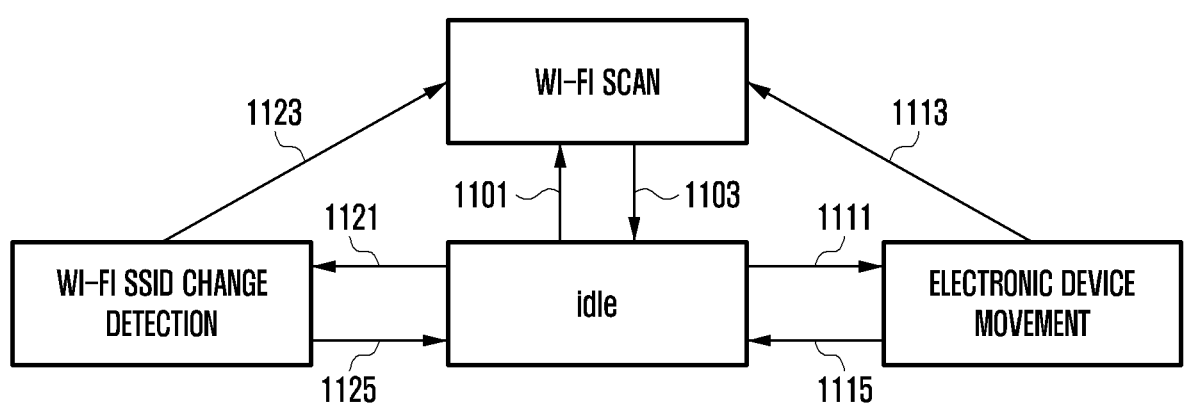
FIG. 11 illustrates a method for scanning for merchant information, based on context information of an electronic device according to various embodiments of the disclosure.

According to various embodiments, in operation 1040, the electronic device 310 may increase the Wi-Fi scanning cycle of the electronic device 310 when it is determined that the electronic device 310 is not located in the group area registered in the service server 330. In this case, the battery consumption of the electronic device 310 can be reduced by attempting Wi-Fi scanning less. For another example, when it is determined that the electronic device 310 is not located in the group area registered in the service server 330, the electronic device 310 may turn off Wi-Fi scanning of the electronic device 310. FIG. 11 illustrates a method for scanning for merchant information, based on context information of an electronic device according to various embodiments of the disclosure.

According to various embodiments, the electronic device 310 may perform Wi-Fi scanning, based on context information of the electronic device 310. For example, the context information may include the lapse of a preconfigured time, a change in a Wi-Fi signal received by the electronic device 310, a movement of location of the electronic device 310, a scan button input of a user, and the like.

According to various embodiments, in operation 1101, the electronic device 310 may perform a Wi-Fi scan by identifying whether a predetermined condition has occurred in an idle state. For example, the electronic device 310 may identify whether a preconfigured Wi-Fi scanning cycle has expired or a forced scan command of a user has been input. In operation 1103, the electronic device 310 may return to the idle state again after completing the scan.

According to various embodiments, in operation 1111, the electronic device 310 may determine whether the electronic device 310 has moved in the idle state. For example, in operation 1113, the electronic device 310 may perform a Wi-Fi scan when the degree of movement of the electronic device 310 exceeds a preconfigured value (threshold). For another example, in operation 1115, the electronic device 310 may return to the idle state when the degree of movement of the electronic device 310 does not exceed the preconfigured value (threshold).

According to various embodiments, in operation 1121, when a preconfigured time elapses in the idle state, the electronic device 310 may turn on Wi-Fi scanning to determine whether a Wi-Fi signal (e.g., a detected Wi-Fi SSID) around the electronic device 310 has changed. For example, in operation 1123, when a change in the surrounding Wi-Fi signal (e.g., a change in the total number of Wi-Fi SSIDs, a change in the type of Wi-Fi SSID, etc.) exceeds a preconfigured value (threshold), the electronic device 310 may additionally perform a Wi-Fi scan. For another example, in operation 1125, the electronic device 310 may return to the idle state when the change in the surrounding Wi-Fi signal does not exceed the preconfigured value.

Figure 12:
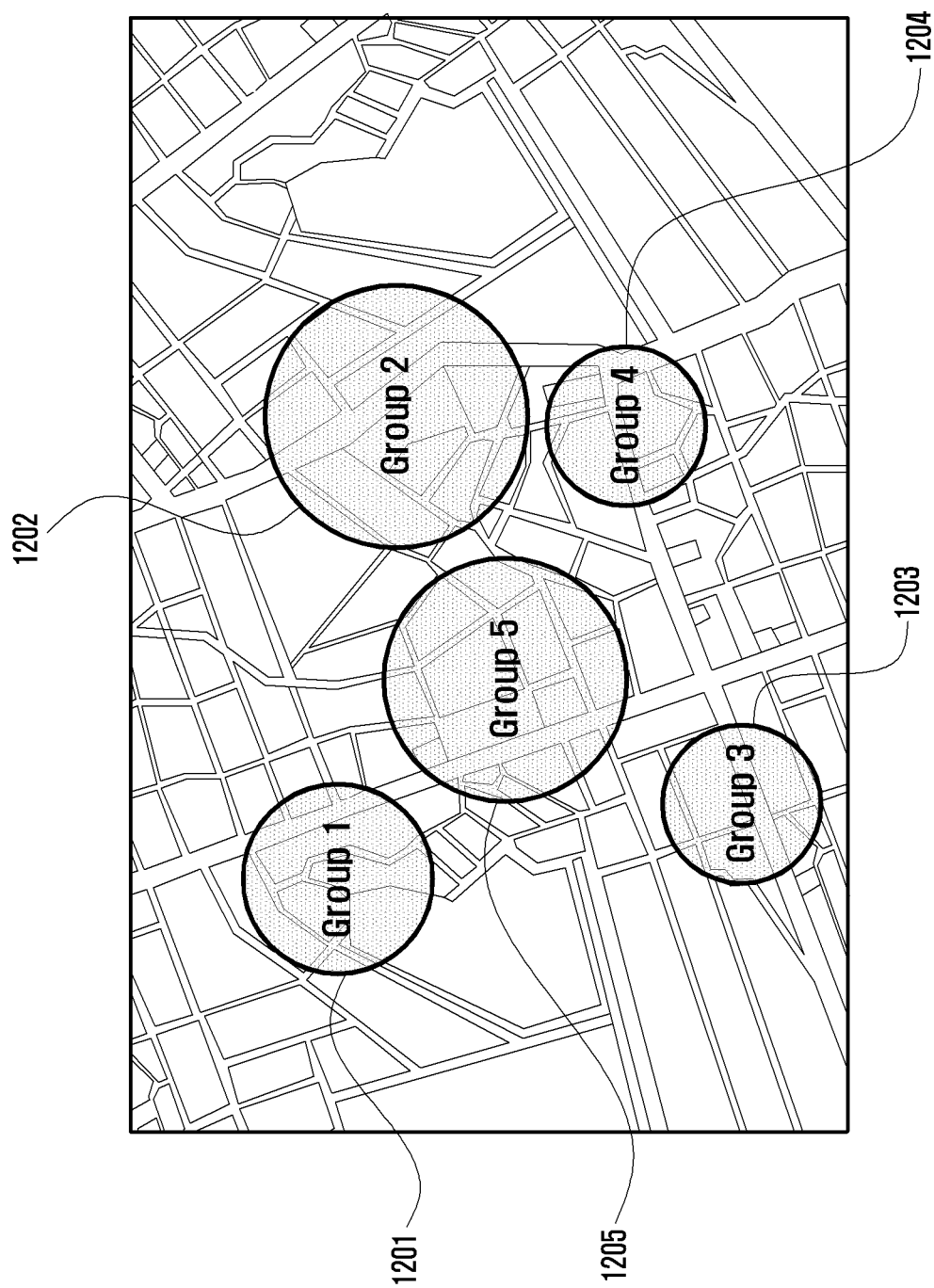
FIG. 12 illustrates a group area registered in a service server according to various embodiments of the disclosure.

FIG. 12 illustrates a group area registered in a service server according to various embodiments of the disclosure.

According to various embodiments, the service server 330 may classify various merchants subscribed to a mobile payment service according to a predetermined standard, and store the classified merchants according to predetermined group areas (e.g., 1201, 1202, 1203, 1204, and 1205). For example, the service server 330 may configure and store a place where merchants are densely located, as a group area (e.g., a merchant cluster), and store information on center coordinates (e.g., x and y) and radius length of the group area together.

According to various embodiments, when the electronic device 310 belongs to or is close to a group area stored in the service server 330, the service server 330 may transmit the corresponding information to the electronic device 310 so as to allow the electronic device 310 to control a Wi-Fi scan cycle.

According to various embodiments, the service server 330 may provide information on the group area stored in the service server 330 to the electronic device 310 in advance so that the electronic device 310 controls the Wi-Fi scan cycle of the electronic device 310, without transmitting location information of the electronic device 310 to the service server 330 in real time.

An electronic device according to various embodiments may include: a display; a communication module; a memory; and a processor, wherein the processor is configured to: scan, through the communication module, for at least one signal emitted by at least one external electronic device around the electronic device; receive, through the communication module, identification information corresponding to a first external electronic device representative of a merchant from the first external electronic device, based on the scanning; verify the received identification information; request, through the communication module, a second external electronic device for merchant information corresponding to the merchant when the verification of the identification information is completed; and receive, through the communication module, the merchant information from the second external electronic device.

A method of an electronic device according to various embodiments may include: scanning for at least one signal emitted by at least one external electronic device around the electronic device; receiving identification information corresponding to a first external electronic device representative of a merchant from the first external electronic device, based on the scanning; verifying the received identification information; requesting a second external electronic device for merchant information corresponding to the merchant when the verification of the identification information is completed; and receiving the merchant information from the second external electronic device.

The processor may be configured to display, through the display, at least one item provided by the merchant, based on the received merchant information.

The processor may be configured to receive, through the display, an input for selecting a specific item from among the displayed at least one item, and transmit a request for the specific item to the second external electronic device through the communication module.

The processor may be configured to receive a response to the request for the specific item from the second external electronic device through the communication module.

The identification information may include Wi-Fi SSID information and MAC address information of the first external electronic device.

The Wi-Fi SSID information of the first external electronic device may include a first hash key assigned to the first external electronic device by the second external electronic device.

The processor may be configured to generate a second hash key, based on the MAC address information of the first external electronic device, determine whether the first hash key and the second hash key are the same, and verify the identification information of the first external electronic device, based on the determination.

The processor may be configured to scan for the at least one signal emitted by the at least one external electronic device around the electronic device, based on context information of the electronic device.

The context information may include at least one of a movement distance of the electronic device, a change in a signal detected by the electronic device, an arrival of a preconfigured scan cycle, and a scan command received by the electronic device.

The processor may be configured to control a cycle of scanning for the at least one signal emitted by the at least one external electronic device around the electronic device, based on location information of the electronic device and merchant location information received from the second external electronic device.

A method of an electronic device according to various embodiments may include: scanning for at least one signal emitted by at least one external electronic device around the electronic device; receiving identification information corresponding to a first external electronic device representative of a merchant from the first external electronic device, based on the scanning; verifying the received identification information; requesting a second external electronic device for merchant information corresponding to the merchant when the verification of the identification information is completed; and receiving the merchant information from the second external electronic device.

The method may further include displaying at least one item provided by the merchant, based on the received merchant information.

The method may further include: receiving an input for selecting a specific item from among the displayed at least one item; and transmitting a request for the specific item to the second external electronic device.

The method may further include receiving a response to the request for the specific item from the second external electronic device.

The identification information may include Wi-Fi SSID information and MAC address information of the first external electronic device.

The Wi-Fi SSID information of the first external electronic device may include a first hash key assigned to the first external electronic device by the second external electronic device.

The method may further include: generating a second hash key, based on the MAC address information of the first external electronic device; determining whether the first hash key and the second hash key are the same; and verifying the identification information of the first external electronic device, based on the determination.

The scanning may include scanning for the at least one signal emitted by the at least one external electronic device around the electronic device, based on context information of the electronic device.

The context information may include at least one of a movement distance of the electronic device, a change in a signal detected by the electronic device, an arrival of a preconfigured scan cycle, and a scan command received by the electronic device.

The method may further include controlling a cycle of scanning for the at least one signal emitted by the at least one external electronic device around the electronic device, based on location information of the electronic device and merchant location information received from the second external electronic device.

What is claimed is:

1. An electronic device comprising:
    a display;
    a communication module;
    a memory; and
    a processor,
    wherein the processor is configured to:
        obtain location information of the electronic device;
        identify, through the communication module, whether the electronic device is located in a group area registered in a second electronic device;
        set a scanning period to a first value if the electronic device is identified as being located in a group area registered in the second electronic device, or set the scanning period to a second value if the electronic device is not identified as being located in a group area registered in the second electronic device, wherein the second value is larger than the first value;
        perform periodic scans, which are separated by the scanning period and performed through the communication module, for at least one signal emitted by at least one external electronic device around the electronic device;
        receive, through the communication module, identification information corresponding to a first external electronic device representative of a merchant from the first external electronic device, based on the scanning;
        verify the received identification information by:
            receiving a first hash key corresponding to the first external electronic device from a second external electronic device,
            generating a second hash key based on at least part of the received identification information, and
            determining whether the received identification information is valid if the first hash key and the second hash key are the same;
        request, through the communication module, the second external electronic device for merchant information corresponding to the first external electronic device when the identification information is valid; and
        receive, through the communication module, the merchant information corresponding to the first external electronic device from the second external electronic device.

2. The electronic device as claimed in claim 1, wherein the processor is configured to display, through the display, at least one item provided by the merchant, based on the received merchant information.

3. The electronic device as claimed in claim 2, wherein the processor is configured to: receive, through the display, an input for selecting a specific item from among the displayed at least one item; and transmit a request for the specific item to the second external electronic device through the communication module.

4. The electronic device as claimed in claim 3, wherein the processor is configured to receive a response to the request for the specific item from the second external electronic device through the communication module.

5. The electronic device as claimed in claim 1, wherein the identification information comprises Wi-Fi SSID information and MAC address information of the first external electronic device.

6. The electronic device as claimed in claim 5, wherein the Wi-Fi SSID information of the first external electronic device comprises the first hash key assigned to the first external electronic device by the second external electronic device.

7. The electronic device as claimed in claim 6, wherein the processor is configured to: generate the second hash key, based on the MAC address information of the first external electronic device; determine whether the first hash key and the second hash key are the same; and verify the identification information of the first external electronic device, based on the determination.

8. The electronic device as claimed in claim 1, wherein the processor is configured to scan for the at least one signal emitted by the at least one external electronic device around the electronic device, based on context information of the electronic device.

9. The electronic device as claimed in claim 8, wherein the context information comprises at least one of a movement distance of the electronic device, a change in a signal detected by the electronic device, an arrival of a preconfigured scan cycle, or a scan command received by the electronic device.

10. A method of an electronic device, the method comprising:
   obtaining location information of the electronic device;
   identifying whether the electronic device is located in a group area registered in a second electronic device;
   setting a scanning period to a first value if the electronic device is identified as being located in a group area registered in the second electronic device, or setting the scanning period to a second value if the electronic device is not identified as being located in a group area registered in the second electronic device, wherein the second value is larger than the first value;
   performing periodic scans, which are separated by the scanning period, for at least one signal emitted by at least one external electronic device around the electronic device;
   receiving identification information corresponding to a first external electronic device representative of a merchant from the first external electronic device, based on the scanning;
   verifying the received identification information by:
      receiving a first hash key corresponding to the first external electronic device from a second external electronic device,
      generating a second hash key based on at least part of the received identification information, and
      determining whether the received identification information is valid if the first hash key and the second hash key are the same;
   requesting a second external electronic device for merchant information corresponding to the first external electronic device when the identification information is valid; and
   receiving the merchant information corresponding to the first external electronic device from the second external electronic device.

11. The method as claimed in claim 10, further comprising displaying at least one item provided by the merchant, based on the received merchant information.

12. The method as claimed in claim 11, further comprising:
   receiving an input for selecting a specific item from among the displayed at least one item;
   transmitting a request for the specific item to the second external electronic device; and
   receiving a response to the request for the specific item from the second external electronic device.

13. The method as claimed in claim 10, wherein the identification information comprises Wi-Fi SSID information and MAC address information of the first external electronic device, and
   the Wi-Fi SSID information of the first external electronic device comprises the first hash key assigned to the first external electronic device by the second external electronic device.

14. The method as claimed in claim 13, wherein verifying of the received identification information comprises:
   generating the second hash key, based on the MAC address information of the first external electronic device;
   determining whether the first hash key and the second hash key are the same; and
   verifying the identification information of the first external electronic device, based on the determination.

* * * * *